United States Patent

Röhrle

[11] 4,268,786
[45] May 19, 1981

[54] POSITION PICKUP FOR NUMERICALLY CONTROLLED MACHINE TOOLS

[75] Inventor: Josef Röhrle, Erlangen, Fed. Rep. of Germany

[73] Assignee: Siemens Aktiengesellschaft, Berlin and Munich, Fed. Rep. of Germany

[21] Appl. No.: 87,309

[22] Filed: Oct. 22, 1979

[30] Foreign Application Priority Data

Nov. 3, 1978 [DE] Fed. Rep. of Germany ....... 2847779

[51] Int. Cl.³ .............................................. G05R 1/06
[52] U.S. Cl. .................................. 318/661; 318/608; 340/347 SY
[58] Field of Search .............................. 318/608, 661; 340/347 SY

[56] References Cited

U.S. PATENT DOCUMENTS

| 3,173,001 | 3/1965 | Evans | 318/608 X |
| 4,095,159 | 6/1978 | Tirelli | 318/661 X |
| 4,134,106 | 1/1979 | Hungerford | 318/661 X |
| 4,160,245 | 7/1979 | Scott | 318/661 X |

*Primary Examiner*—B. Dobeck
*Attorney, Agent, or Firm*—Kenyon & Kenyon

[57] ABSTRACT

A position pickup for numerically controlled machine tools having a resolver which is fed on the primary side by two voltages shifted 90° relative to each other and which is coupled to the moving machine part. The voltages are generated in a digital sine-cosine generator made of decimal frequency divider stages. When the secondary voltage in the resolver goes through zero, as detected by a comparator coupled thereto through a filter, the state of the generator is transferred to a memory and serves as the actual position value. To compensate for phase drift in the filter used on the secondary side, the filter is connected at fixed intervals to a reference signal derived from the primary side and changes in the measured values so obtained, and stored in the memory, used for correcting the actual position value.

2 Claims, 3 Drawing Figures

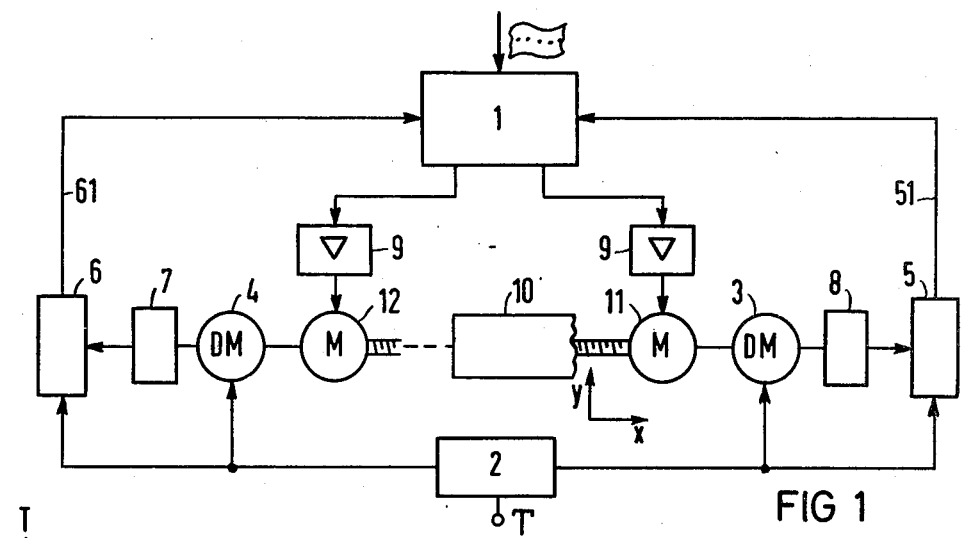
FIG 1
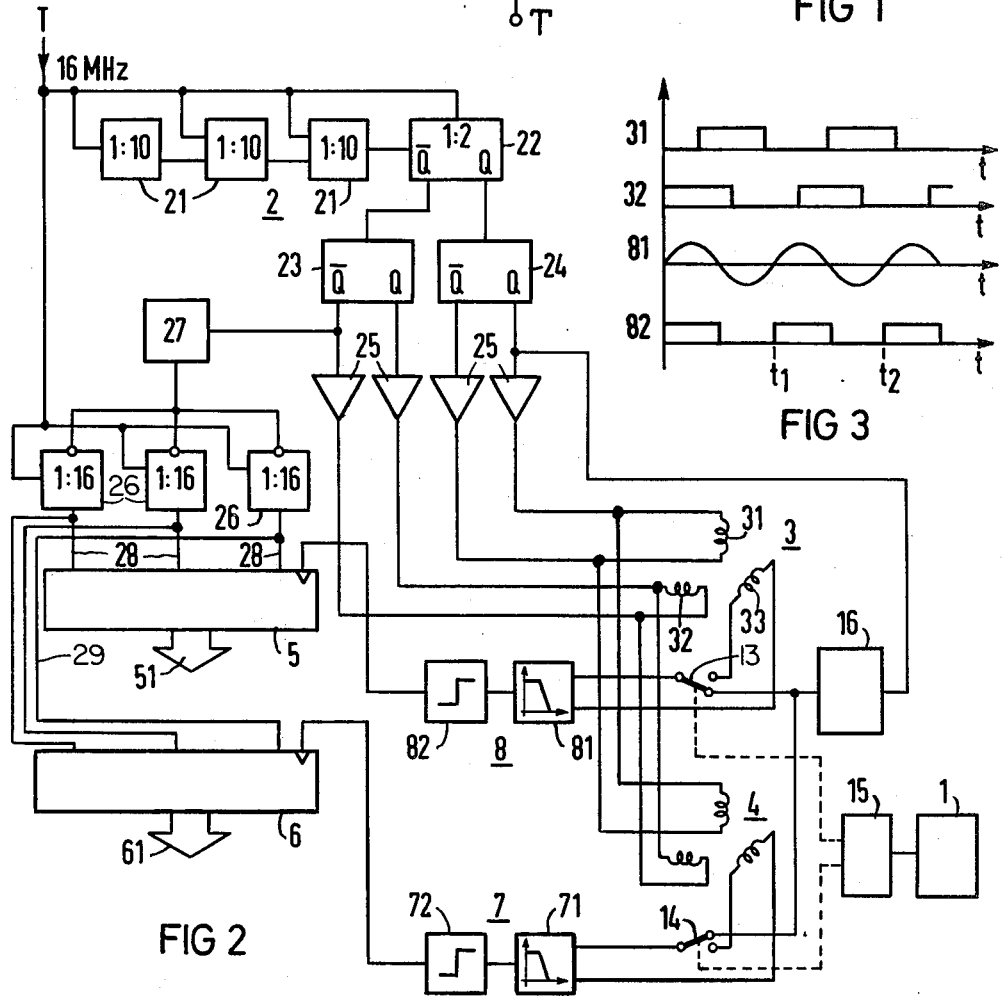
FIG 2
FIG 3

POSITION PICKUP FOR NUMERICALLY CONTROLLED MACHINE TOOLS

BACKGROUND OF THE INVENTION (a) Field of the Invention

This invention relates to a position pickup device for use in numerically controlled machine tools in which the moving machine part is coupled to a resolver (synchro transmitter), or the like, which is fed on the primary side with two voltages. The voltages, which are electrically shifted 90° relative to each other, are generated from a clock frequency by means of a sine-cosine generator constructed from divider stages. The phase of the voltage on the secondary side of the transmitter relative to the voltage on the primary side is a measure for the value of position. More particularly it relates to an arrangement for improving accuracy in such a device.

(b) Discussion of the Prior Art

Reference is made to the arrangement described in U.S. Pat. No. 3,173,001 where voltages on the secondary side of a synchro transmitter are converted into square wave voltages derived from a clock frequency and their phase is compared with reference values in the form of square wave voltages. The control commands for the drives on the individual axes of the machine are derived from this comparison.

In computer controlled machine tools, it is necessary to form a digital signal for the actual position.

In accordance with co-pending application Ser. No. 14,431 assigned to the same assignee as the present invention, this problem is solved by generating a value proportional to the angular position of a resolver excited by a sine-cosine generator as determined at the time the output of the secondary side of the resolver crosses through zero. A dividing chain driven by a clock generator times the output of the sine-cosine generator and a second time chain, also driven by the clock generator, drives a register which counts over an interval initiated by the sine-cosine generator and ended by the zero crossing of the resolver output. The zero crossover is detected by a comparator coupled through a filter to the resolver secondary. In this way with essentially no additional costs it is possible to obtain a true position value suitable for digital processing in the computer. However, the filters and comparators used in this system, even where high grade filters are used, have a thermal phase drift which can effect the accuracy of such a device.

SUMMARY OF THE INVENTION

It is the object of the present invention to increase the accuracy of measurement in such a device while compensating the phase drift. In accordance with the present invention this problem is solved by switching the filter at fixed intervals to a voltage derived from the primary side voltage and by detecting a change of the signal state of the sine-cosine generator at the zero crossing and using this value, in successive switching operations to correct the value determined as the actual position. In this manner, a correction value for the compensation of the phase drift can be obtained with the measuring equipment available anyway for acquisition of the measured value. This leads to a further advantage in that relatively cheap filters may also be used since even the phase drift of these filters is detectable and hence can be compensated.

BRIEF DESCRIPTION OF THE DRAWINGS

FIG. 1 is a block diagram of an embodiment of the invention which is shown in conjunction with a numerical machine tool control;

FIG. 2 is a schematic circuit diagram of the measurement system used in the machine tool control of FIG. 1; and FIG. 3 is a chart showing timing relationships in the circuit of FIG. 2.

DETAILED DESCRIPTION OF THE INVENTION

The carriage 10 of a machine tool is shown in FIG. 1 which can be moved in the direction of the X and Y axes by drive motors 11 and 12. For this purpose, the motors 11 and 12 are appropriately addressed via thyristor elements 9 by a numerical (CNC) control 1 which includes a microprocessor. For forming the control commands, the actual position of the carriage 10 must be determined. To this end, drive motors 11 and 12 are coupled to resolvers 3 and 4, respectively, the rotors of which are rotated in proportion to the displacements on the respective axes. The stator windings of resolvers 3 and 4 are fed with two voltages of equal amplitude, but electrically shifted by 90° relative to each other, which are generated from a clock frequency T by means of digital sine-cosine generator 2. The phase of the voltage induced in the rotor winding relative to the voltage in the stator windings therefore depends on the position in space of the rotor winding relative to the stator windings.

The position of the carriage 10 can therefore be established from the phase of the voltage on the secondary side. This is accomplished when the voltage induced in the rotor winding crosses zero. At that instant a value corresponding to the state of the outputs of sine-cosine generator 2 is transferred into registers 5 or 6, as is appropriate under the circumstances. The values so stored are transferred from the registers into control 1 at fixed times via the data lines 51 and 61.

The measuring system will be explained in detail with reference to FIG. 2.

Sine-cosine generator 2 is fed from a clock generator, not shown, having an output clock frequency T; it comprises three series connected divider or counter stages 21 having decimal division ratios of 1:10. Divider stages 23 and 24, having division ratios of 1:2, are connected to the output Q and the inverting output Q, respectively, of the last cascaded stage 22, which also has a division ratio of 1:2, so that between the two outputs of divider stages 23 and 24, square wave voltages with a frequency of 4 kHz, can be taken off via amplifiers 25. In this illustrative embodiment, the square wave voltages have a resolution of 5 μ.

The square wave voltages, shifted electrically relative to each other by 90° at the outputs of the amplifiers 25, are fed to primary stator windings 31 and 32, respectively, of transmitter 3. These waveforms can be seen on the lines 31 and 32 of FIG. 3. The voltage taken off at rotor winding 33 of mitter 3 is fed to an evaluator stage 8, which consists of low pass filter 81 followed by comparator 82. Comparator 82 switches at each zero crossing of the rotor voltage. The waveform of the output voltages from filter 81 and from comparator 82 are shown in lines 81 and 82 of FIG. 3. There, the times $t_1$ and $t_2$ when the output voltage of filter 81 crosses zero can be seen as depending on the phase of the rotor voltage relative to the stator voltages (shown in lines 31 and 32, respectively). A change of position in time of the zero crossings relative to the input of the stator windings is therefore an index for a turn of the rotor and thus an index for displacement of the machine part. In order to obtain a signal corresponding to the position of the rotor, the signal state of the sine-cosine generator 2 present at the instant in question must be established, i.e. its instantaneous division and counting state, as the latter is a measure for the phase of the stator voltages relative to the rotor voltage. To this end, the clock frequency T is also fed to three series-connected divider stages 26, each of which has a division ratio of 1:16. In this case a signal in binary form is generated as it will be needed in this form in further processing. In the illustrative embodiment, the three dividers 26 provide for a total count of 4096. Divider stages 26 are reset to zero by clearing stage or driver 27 triggered by the output Q of divider 23, every time a period of 4000 alternations of the sine-cosine generator 2 has been swept through. The parallel count then begins again, running to the time of zero crossing of the rotor voltage and generating a new representation of the state of sine-cosine generator 2. This value is transferred into register 5 via lines 28 at the time of zero crossing, i.e., the switching of comparator 82. From there it is called up by control 1 via data line 51 at defined time intervals of, say, 4 milliseconds.

As indicated in the drawing, the same generator 2 and the same divider stages 26 can be used to supply the same square wave voltages to the stator windings of the second transmitter 4. In this case, the voltage taken off from the rotor of resolver 4 is picked up by an evaluator stage 7 consisting of filter 71 and comparator 72 to effect the transfer of the respective state of divider stages 26 at the time of zero crossing of the rotor voltage into register 6 via lines 29. This value is then likewise fed to control 1 via data lines 61 at the proper time.

As is evident, the same system can also be used for still other synchro transmitters or for linear measuring systems of similar design.

As can be seen from FIG. 2, filter 81 can be selectively switched between the secondary winding 33 and a level converter 16 by means of a switch 13. Switching is done at fixed intervals within the measurement pauses by means of a stage 15 energized by the CNC control 1. If the filter is connected to the level converter 16, then, upon zero crossing of the voltage in comparator 82, a certain measured value will be transferred to register 5. This can then be transferred into a memory position. If the measured value changes, for example, due to thermal phase drift of the filter 81, the change, i.e., the difference between the new and old measured values can then be used as a correction value for the measured values obtained in the detection of actual position. In this way, the phase drift of the filter and comparator is largely compensated.

The same correction can also be carried out with respect to filter 71. For this purpose a switch 14, also controlled by stage 15 is provided. Switch 14 selectively connects the filter 71 to the secondary winding of synchro 4 or to the level converter 16.

What is claimed is:

1. In a position pickup for use in numerically controlled machine tools comprising
    a resolver coupled to the machine part to be moved and having a primary side and a secondary side in which the phase of the voltage on the secondary side relative to the phase of the voltage on the primary side is a measure of position value,
    a digital sine-cosine generator made up of divider stages for generating two voltages which are electrically shifted 90° relative to each other from a clock frequency and supplying them to the primary side, and
    means for generating a value proportional to the signal states of the sine-cosine generator at the time of zero crossing of the voltage on the secondary side as a measure of the actual position, including a filter having its input coupled to said secondary side and a comparator having its input coupled to the output of said filter for detecting the zero crossover of the filter output, the improvement comprising:
    means for deriving a voltage from the primary side; and means to detect the signal state of the sine-cosine generator at the time of zero crossing of the output of said filter when coupled to said means providing a voltage derived by the primary voltage whereby, in successive switching operations the change of the signals state of said sine-cosine generator as so detected may be used for correcting said value proportional to the signal states.

2. In a method of generating a digital signal value proportional to angular rotation which comprises the steps of:
    generating two voltages electrically shifted 90° from each other in a sine-cosine generator by dividing a signal from a clock generator;
    generating a binary value for storage in a register by dividing a signal from the clock generator in resettable binary counters;
    generating a signal whose phase is a function of angular position by applying the outputs of the sine-cosine generator to the primary windings of an angle resolver,
    clearing the storage register and resetting the counters at the start of a counting period of the sine-cosine generator;
    generating a signal at the time the signal on the secondary winding of the angle resolver goes through zero by coupling said secondary winding to a filter followed by a comparator, and
    transferring the count from the binary dividers at the time of the zero crossing to establish a value proportional to the position angle of the resolver, the improvement comprising:
    alternately coupling said filter to said secondary winding and to a voltage derived from the primary side voltage at fixed intervals; aslo transferring the count from the binary dividers at zero crossover when said filter is coupled to said voltage derived from said primary side voltage; and using the values so obtained in successive switching operations to correct said value proportional to the position angle of the resolver.

* * * * *